US011092948B1

(12) United States Patent
Rikovitch et al.

(10) Patent No.: US 11,092,948 B1
(45) Date of Patent: Aug. 17, 2021

(54) SYSTEMS AND METHODS OF DETERMINING A DIFFERENCE OF POSITION BETWEEN A MALLEABLE OBJECT AND A TARGET SHAPE

(71) Applicant: Ontario Die International Inc., Kitchener (CA)

(72) Inventors: Nir Rikovitch, Kitchener (CA); Trevor Sean Barnwell, Kitchener (CA); Robert Gordon Hurley, Cambridge (CA); Paul Sajecki, Waterloo (CA); Agustin Daniel Perez Paladini, Cordoba (AR)

(73) Assignee: Ontario Die International Inc., Kitchener (CA)

( * ) Notice: Subject to any disclaimer, the term of this patent is extended or adjusted under 35 U.S.C. 154(b) by 61 days.

(21) Appl. No.: 16/713,786

(22) Filed: Dec. 13, 2019

Related U.S. Application Data

(60) Provisional application No. 62/779,773, filed on Dec. 14, 2018.

(51) Int. Cl.
*G05B 19/418* (2006.01)
*B23Q 15/14* (2006.01)

(52) U.S. Cl.
CPC ....... *G05B 19/41875* (2013.01); *B23Q 15/14* (2013.01); *G05B 2219/31359* (2013.01); *G05B 2219/37346* (2013.01)

(58) Field of Classification Search
None
See application file for complete search history.

(56) References Cited

U.S. PATENT DOCUMENTS

2018/0202797 A1\* 7/2018 Kawashima ......... G01B 11/026

\* cited by examiner

*Primary Examiner* — Ryan A Jarrett
(74) *Attorney, Agent, or Firm* — Woods Oviatt Gilman LLP; Dennis B. Danella, Esq.

(57) ABSTRACT

Systems and methods of determining a difference of position between a malleable object and a target shape are described herein.

19 Claims, 16 Drawing Sheets

SYSTEMS AND METHODS OF DETERMINING A DIFFERENCE OF POSITION BETWEEN A MALLEABLE OBJECT AND A TARGET SHAPE

CROSS-REFERENCE TO RELATED APPLICATIONS

This application claims the benefit of U.S. Patent Application No. 62/779,773 filed on Dec. 14, 2018, which is hereby incorporated by reference in its entirety.

TECHNICAL FIELD

The embodiments disclosed herein relate to systems and methods of manipulating malleable objects to form predetermined two dimensional shapes, and more specifically to systems and methods of manipulating malleable objects having features to form target geometrical shapes based on the position of the features.

BACKGROUND

A die is a specialized tool used in manufacturing industries to cut or shape material using a press. Dies generally have customized shapes depending on the size and shape of the end product that the die will be used to create.

Dies are traditionally made by performing a series of bending operations on a metal strip (e.g. a steel strip). The metal strip is typically sharpened on one edge to form a cutting edge. Notches, bends and other features, collectively referred to as features, may be added to the metal strip prior to forming the die. Features may assist in aligning the material, in some examples, on the die prior to cutting the material, or may be used prior to stitching cut pieces into an end product.

Individual metal strips generally do not have identical physical properties and therefore react differently when features are added to the strip. Accordingly, two separate metal strips that are intended to be formed into dies having a same shape may require different bending operations to form into dies having the same shape.

Automation of bending metal strips to form dies is a growing area of technological development. To account for slight changes in shapes of metal strips after features have been added to the strips, computer systems need to be developed that can scan the precise shape of the metal strip after the features have been added to the strip to determine a difference between the current shape of the metal strip and the desired shape of the die to be formed from the metal strip.

SUMMARY

Systems and methods of determining a difference of position between a malleable object and a target shape are described herein.

The systems include a first computing device having a first processor, a first non-transitory processor-readable storage medium communicatively coupled to the first processor, and a first communication interface communicatively coupled to the first processor. The processor is configured to execute a method of determining a difference of position between a malleable object and a target shape.

The methods include setting a first axis of rotation of the target shape at a point where a first feature of the malleable object is aligned with a corresponding first feature of the target shape; rotating the target shape about the first axis of rotation until a second feature of the target shape is aligned with a corresponding second feature of the malleable object; when the second feature of the target shape is aligned with the second feature of the malleable object, calculating a first error between a third feature of the target shape and a third feature of the malleable object, the third feature of the target shape being positioned a greater distance away from the first feature of the target shape than the second feature of the target shape, and the third feature of the malleable object being positioned a greater distance away from the first feature of the malleable object than the second feature of the malleable object; rotating the target shape about a second axis of rotation until the third feature of the malleable object is aligned with the third feature of the target shape, the second axis of rotation being at a point where the second feature of the malleable object is aligned with the corresponding second feature of the target shape; and when the third feature of the target shape is aligned with the third feature of the malleable object, calculating a second error between a fourth feature of the target shape and a fourth feature of the malleable object, the fourth feature of the target shape being positioned a greater distance away from the first feature of the target shape than the second feature of the target shape and the third feature of the target shape, and the third feature of the malleable object being positioned a greater distance away from the first feature of the malleable object than the second feature of the malleable object and the third feature of the malleable object. The first error and the second error define a difference of position between the malleable object and the target shape.

These and other features and advantages of the present application will become apparent from the following detailed description taken together with the accompanying drawings. However, it should be understood that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

DETAILED DESCRIPTION

Figure 1:
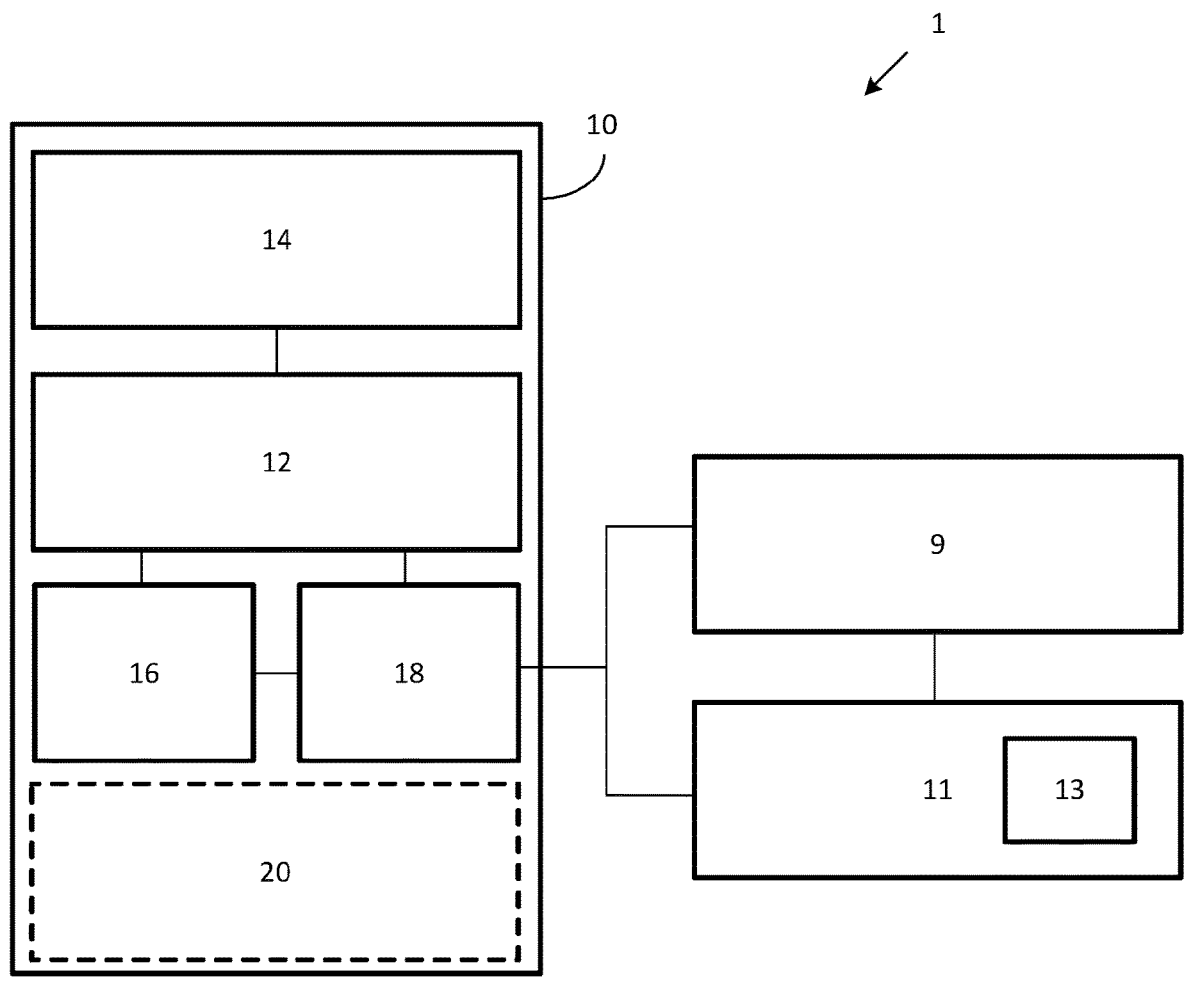
FIG. 1 is a block diagram showing a system for manipulating malleable objects having features to form known polygon shapes based on the position of the features, according to at least one embodiment.

Various systems and methods are described below to provide an example of at least one embodiment of the claimed subject matter. No embodiment described below limits any claimed subject matter and any claimed subject matter may cover apparatuses and methods that differ from those described below. The claimed subject matter are not limited to systems and methods having all of the features of any one system and method described below or to features common to multiple or all of the systems and methods described below. Subject matter that may be claimed may reside in any combination or sub-combination of the elements or process steps disclosed in any part of this document including its claims and figures. Accordingly, it will be appreciated by a person skilled in the art that a system or method disclosed in accordance with the teachings herein may embody any one or more of the features contained herein and that the features may be used in any particular combination or sub-combination that is physically feasible and realizable for its intended purpose.

Furthermore, it is possible that a system or method described below is not an embodiment of any claimed subject matter. Any subject matter that is disclosed in an system or method described herein that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

It will also be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially", "about" and "approximately" as used herein mean a reasonable amount of deviation of the modified term such that the result is not significantly changed. These terms of degree should be construed as including a deviation of the modified term, such as 1%, 2%, 5%, or 10%, for example, if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made, such as 1%, 2%, 5%, or 10%, for example, if the end result is not significantly changed.

It should be noted that the term "coupled" used herein indicates that two elements can be directly coupled to one another or coupled to one another through one or more intermediate elements.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers may be a server, network appliance, embedded device, computer expansion module, a personal computer, laptop, personal data assistant, cellular telephone, smartphone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

In spite of the technologies that have been developed, there remains a need in the field for systems and methods of manipulating malleable objects to form target shapes.

The systems and methods described herein can be used to manipulate a malleable object to form a target (e.g. predetermined polygonal) shape. In some embodiments, the systems and methods described herein can be used to manipulate a malleable object by bending the malleable object into a shape that matches a target shape based on a set of features that is common to the malleable object and the shape.

It is envisioned that the systems and methods described herein may be applied to various applications. For instance, the systems and methods described herein may be used in die manufacturing. In die manufacturing, it is common to determine or be provided with a target shape of a die before physically forming the die. A die is generally formed into a target shape by manipulating (e.g. bending) a linear metal strip (e.g. steel strip). Features including but not limited to notches, nicks, bends and the like, may be added to the metal strip prior, intertwined, or after bending the metal strip into a fully formed die having a desired shape.

In some embodiments, the systems and methods described herein propose to use the features added to metal strips prior to forming a die having the desired shape as reference points for forming the die.

In some embodiments, the systems and methods described herein propose to use the features added to metal strips during forming a die having the desired shape as reference points for forming the die.

In some embodiments, the systems and methods described herein propose to use the features added to metal strips after forming a die having the desired shape as reference points for forming the die.

To automate the process of forming a die, the systems and methods described herein propose to use a computing device to compare an actual real-world position and orientation of a malleable object to a computer-assisted drawing of a predetermined shape. The real-world position and orientation of the malleable object may be obtained using any object positional scanning techniques, including but not limited to edge detection techniques. The computer-assisted drawing of the predetermined shape may be stored in any design and drafting software application, such as but not limited to AutoCAD, on the computing device.

Referring to FIG. 1, shown therein is a block diagram illustrating a system 1 for comparing a position of a malleable object to a computer-assisted drawing of a target shape. System 1 includes a computing device 10 in accordance with one or more implementations, a scanning device 11 and an actuating device 9.

Computing device 10 includes one or more non-transitory computer- or processor-readable storage media 12, one or more processors 14, one or more communication interfaces 16 (e.g., one or more tethered connector ports, radios and associated antennas (not shown)), an input/output (I/O) subsystem 18 and an optional power system 20.

The one or more non-transitory computer- or processor-readable storage media 12 optionally includes high-speed random access memory and optionally also includes non-volatile memory, such as one or more magnetic disk storage devices, flash memory devices, or other non-volatile solid-state memory devices. Access to storage medium 12 by other components of device 10, such as processors 14 is, optionally, controlled by a memory controller (not shown), for example via a bus or other communications channel. The one or more non-transitory computer- or processor-readable media 12 stores processor-executable instructions, and/or data, executable by the one or more processors 14, and which when executed cause the one or more processors 14 to perform the various methods described herein.

The one or more processors 14 run or execute various software programs and/or sets of instructions stored in the one or more non-transitory computer- or processor-readable media 12 to perform various functions for computing device 10 to process data. For instance, the one or more processors 14 or execute a computer-assisted design and drafting software application, such as but not limited to AutoCAD, on the computing device 10.

The one or more communication interfaces 16 receive and send signals (e.g., radio frequency RF or microwave frequency signals, also called electromagnetic signals). The one or more communication interfaces 16 convert electrical signals to/from electromagnetic signals and communicate with communications networks and other communications devices via the electromagnetic signals. The one or more communication interfaces 16 optionally include circuitry for performing such operations, including but not limited to a tethered connector port (e.g., USB, firewire, lightning connector, etc.), an antenna system, an RF transceiver, one or more amplifiers, a tuner, one or more oscillators, a digital signal processor, a CODEC chipset, a subscriber identity module (SIM) card, memory, and so forth. The one or more communication interfaces 16 optionally communicate with networks, such as the Internet, an intranet and/or a wireless network, such as a cellular telephone network, a wireless local area network (LAN) and/or a metropolitan area network (MAN), and other devices by wireless communication.

I/O subsystem 18 couples input/output peripherals of computing device 10, such input or control devices, with a peripherals interface (not shown). I/O subsystem 18 can include a controller for each of the input or devices.

In some embodiments, I/O subsystem 18 couples with the actuating device 9 and the scanning device 11. Actuating device 9 controls movement of the scanning device 11 as the scanning device 11 captures images of the actual real-world position and orientation of the malleable object.

In some embodiments, the actuating device 9 has an arbitrary number of degrees of freedom that mount the scanning device and move it as needed to acquire the data required for the method.

Scanning device 11 (i.e. scanner or imager or profiler) is able to extract set of points from point cloud data to provide a close representation of an edge of the malleable object. In some embodiments, the input point cloud data can be in one of two forms: ordered or carpet scan. In the case of an ordered scan, the scanning device 11 travels along a path that follows an estimate of the malleable object shape to scan the malleable object. When using the ordered scan, consideration does not need to be given for determining malleable object direction or point ordering. Conversely, when using carpet scanning, data produced does not include ordering and an orientation following the path of the cavity is not produced.

Scanning device 11 (i.e. scanner or imager) can be a two-dimensional (2D) scanner or imager, a three-dimensional (3D) scanner or imager, a single spectrum scanner or imager or a multispectral (color, infrared (IR), etc.) scanner or imager. Scanning device 11 receives input data from a sensor 13 of the scanning device 11 (scanner) that is actuated above the cavity (e.g. die) by the actuator 9 and concatenates a 3D point cloud of the edge of the die.

Scanning device 11 generally has a nominal trajectory give to it inferred from the steel provided to the machine (e.g. either straight or prebend with notches). While following the nominal trajectory, scanning device 11 acquires scans (such as but not limited to a 2D slice) that are transformed to a global frame of reference (e.g. by knowing the position of the scanner). Those are filtered for the edge specifically and aggregated together to form an ordered point cloud which is then passed to the CAD matcher. In some embodiments, the edge filter algorithm may be implemented such that it is able to detect and infer multiple edges within its scan region. It is expected that the nominal trajectory would not be precise and thus the scanner adjusts its course such that the peak is always at the center of the swath and the orientation of the edge is perpendicular to the swath as well. It is done by extrapolating the edge location using the peak detection and its instantaneous radius of curvature. It should be noted that in cases where there are multiple peaks within the scanner's swath, the trajectory is dynamically adjusted to track the relevant edge based on physical contiguousness Power system 20 generally provides electrical power to the various components of the computing device 10 (not all connections shown). Power system 20 optionally includes a power management system, one or more power sources (e.g., primary battery cells, secondary power cells, fuel cells, super- or ultra-capacitors), a recharging system, a power failure detection circuit, a power converter or inverter, a power status indicator (e.g., a light-emitting diode (LED)) and any other components associated with the generation, management and distribution of power in portable devices.

The recharging system may receive wired power (from e.g. a micro-USB charger) or wireless power via receipt of electromagnetic waves by one or more inductors or inductive interfaces, and provide the electrical power to the one or more power sources via one or more wired or electrically conductive paths.

Figure 5:
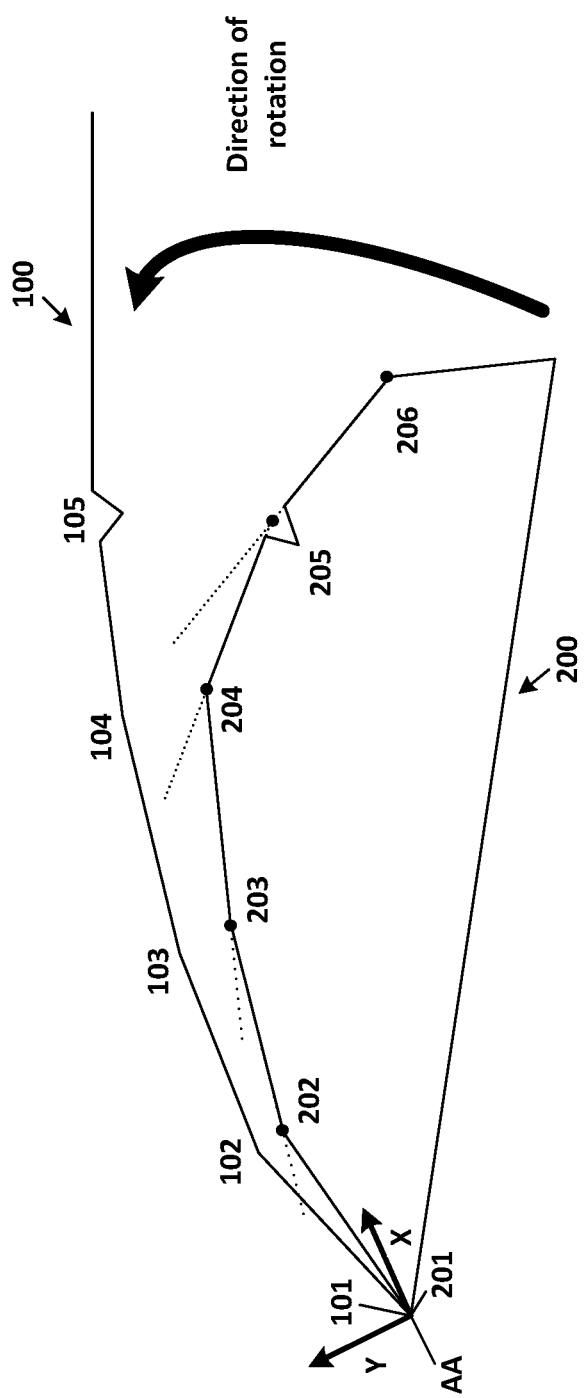
FIG. 5 is a schematic diagram showing a first step of the method of manipulating a malleable object having features to form a predetermined polygon shape based on the position of the features, according to at least one embodiment.

Generally, the system 1 uses a right-handed Cartesian global frame of reference for measuring lengths of a malleable object (such as malleable object 100; see FIG. 5) and/or the target shape (such as target shape 200; see FIG. 5).

Figure 2:
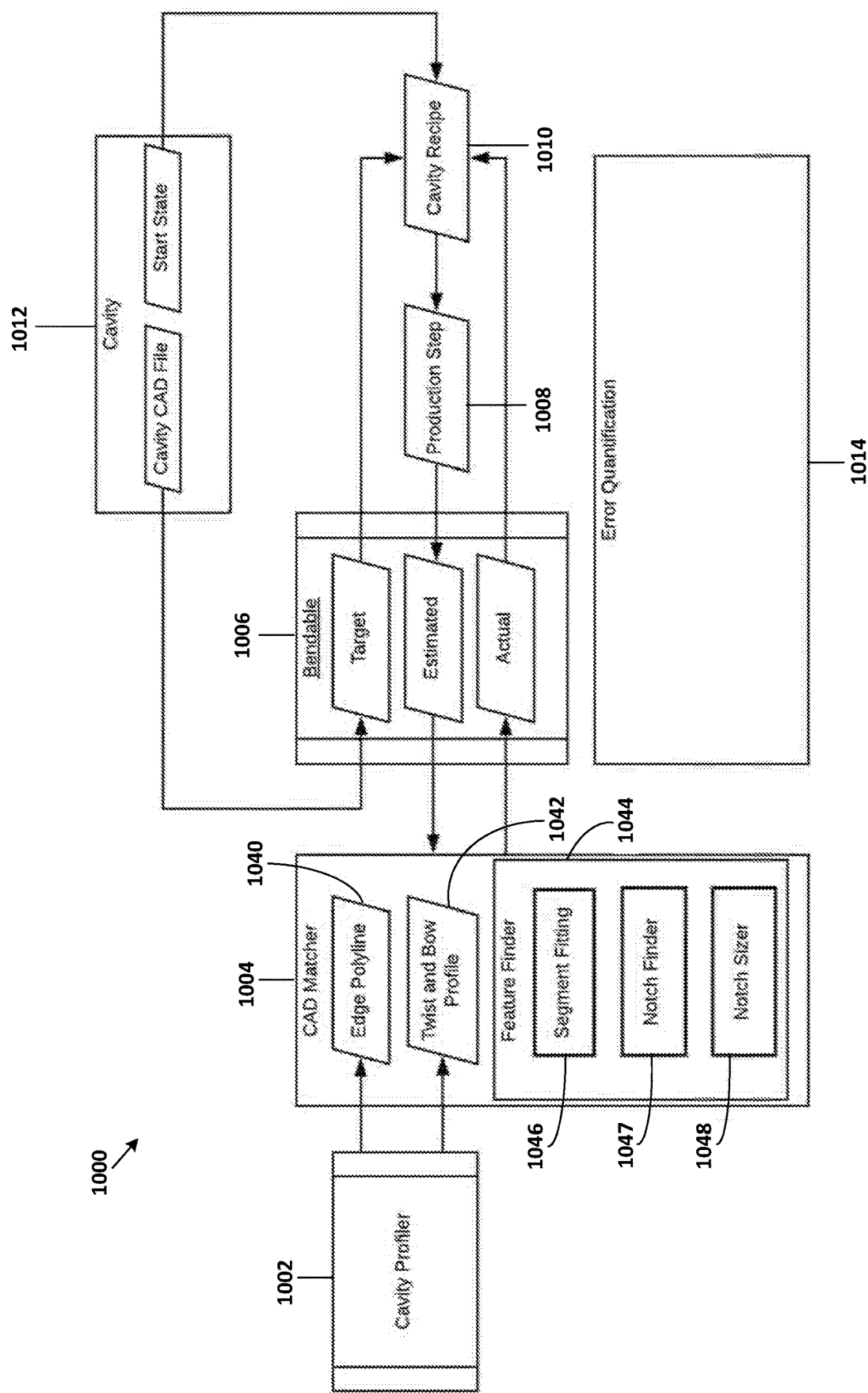
FIG. 2 is a workflow diagram showing a modular software architecture of a system for enabling performing the method of manipulating a malleable object having features to form a target shape based on the position of the features; according to at least one embodiment.

Referring now to FIG. 2, shown therein is a modular system architecture diagram of a system 1000 for enabling automatic bending of a malleable object 100 into a target shape 200 (see FIG. 5), according to one embodiment.

In some embodiments, malleable object 100 can be any malleable object, such as but not limited to a metal strip, that is bendable to form a metal die. In some embodiments, the metal strip may be a steel strip (e.g. steel rule), a stainless steel strip, or any other metal strip having a cutting edge that is appropriate for cutting a material such as but not limited to cardboard, leather or fabric. In some embodiments, malleable object 100 has an edge width (e.g. thickness) that is less than about 20 thou (0.508 mm).

System 1000 includes a cavity profiler module 1002, a CAD matcher module 1004, an error quantification module 1014, a bendable module 1006, a cavity recipe module 1010, a cavity module 1012 and a production step 1008.

Figure 3:
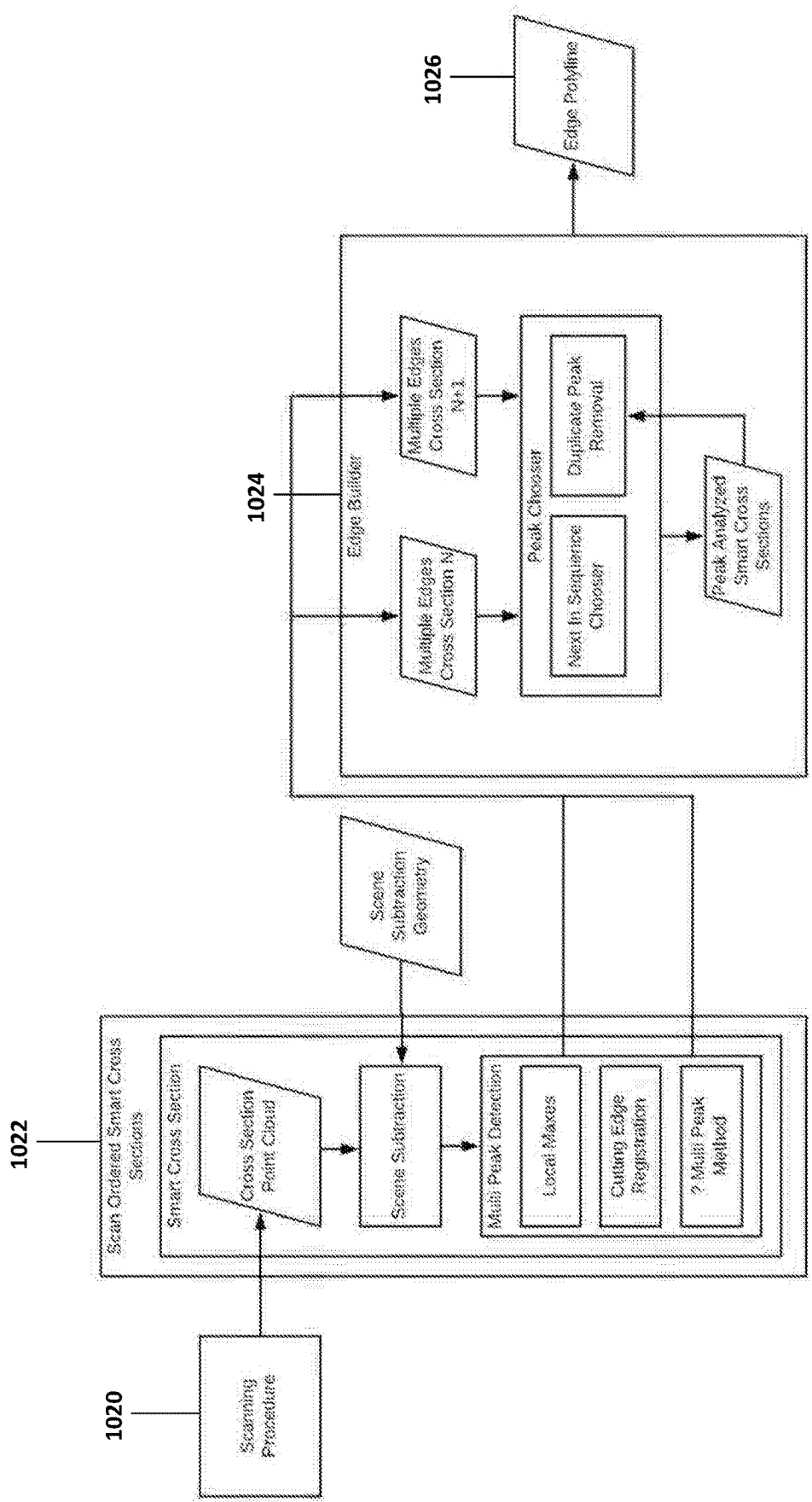
FIG. 3 is a workflow diagram showing a modular software architecture of the cavity profiler of FIG. 1.

Referring now to FIG. 3, shown therein is an architecture diagram of the cavity profiler 1002. Generally, the cavity profiler 1002 is a module that is responsible for creating a two- or three-dimensional point-cloud-based representation of the malleable object 100. The input to the cavity profiler 1002 is the full pose (e.g. position and orientation) of the scanning device 11 and a line-scan (i.e. cross section) as shown at 1020. Based on the a-priori scene geometry, elements that are not of the malleable object are discarded. Then, the cross section is processed at 1022 to extract relevant malleable object profile or multiple profiles. Noise filtering based on scanning device orientation and material reflective properties is applied.

Once a sequence of profiles is available, ordering the cross sections and removing duplication is conducted by the edge builder 1024.

The output of cavity profiler 1002 is a virtual representation of the malleable object 100 in the form of an edge polyline 1026 comprised of ordered points of a selected spatial resolution that depends on the scanner frequency, motion speed and filtering parameters. The virtual representation is provided from the cavity profiler 1002 to the CAD matcher 1004.

CAD matcher 1004 determines steps necessary to align the malleable object 100 and the target shape 200. To determine these steps, the CAD matcher first determines a difference of position between the malleable object 100 and the target shape 200.

Figure 4:
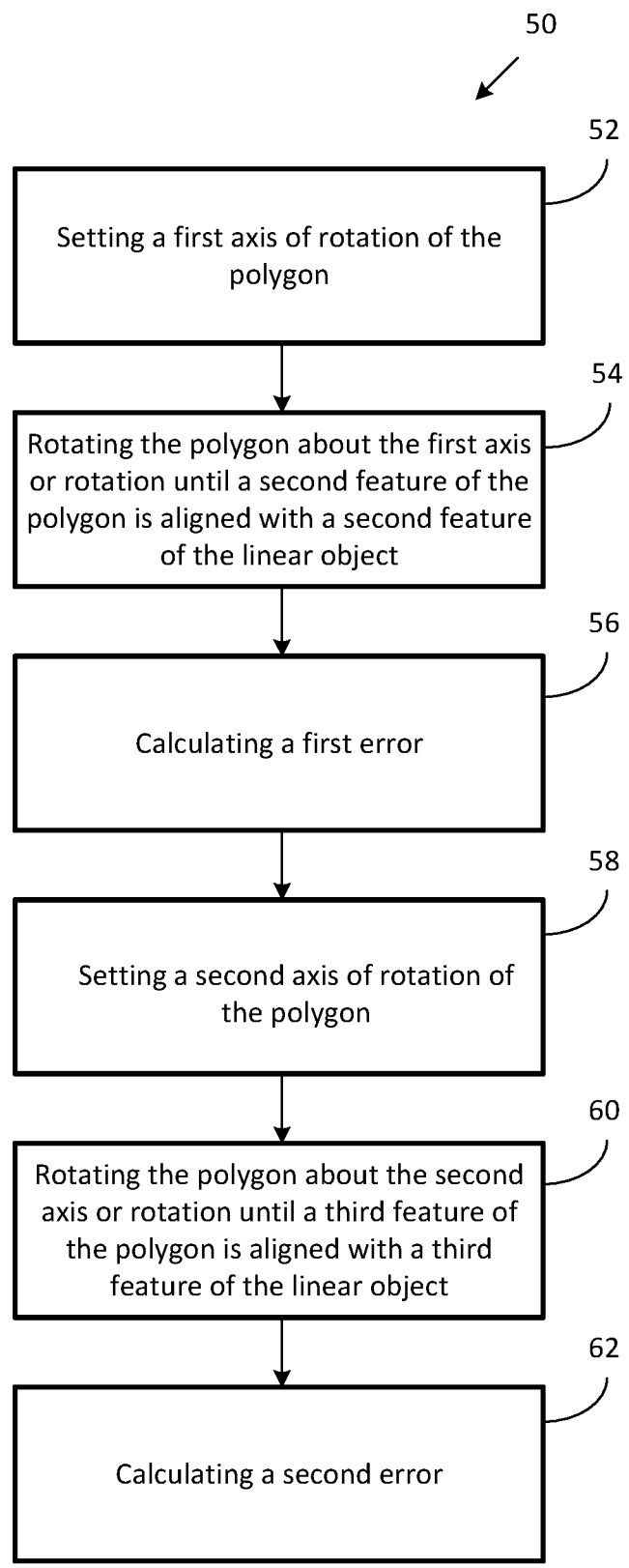
FIG. 4 is a block diagram showing a method of manipulating a malleable object having features to form a target shape based on the position of the features, according to at least one embodiment.

FIG. 4 is a block diagram of a method 50 of determining a difference of position between a malleable object 100 and the target shape 200. The method of determining the difference of position includes identifying one or more types of errors between features of the malleable object 100 and corresponding features of the target shape 200. The types of errors (e.g. point location errors, bend angle errors, polygonal area errors, etc.) are used to identify corrective actions for reshaping the malleable object 100 onto the target shape 200. Corrective actions may include but are not limited to how to bend or form the malleable object 100, where to bend or form the malleable object 100 and what tool to use to bend or form the malleable object 100.

The method 50 includes: a step 52 of setting a first axis of rotation AA of the target shape 200, a step 54 of rotating the target shape 200 about the first axis of rotation AA until a second feature of the target shape 200 is aligned with a second feature of the malleable object 100, a step 56 of calculating a first error, a step 58 of setting a second axis of rotation BB of the target shape 200, a step 60 of rotating the target shape 200 about the second axis of rotation BB until a third feature of the target shape 200 is aligned with a third feature of the malleable object 100, and a step 62 of calculating a second error. The steps of the method 50 are described in further detail below.

FIG. 5 shows a schematic representation of a step 52 in the method 50 of determining a difference of position between malleable object 100 and a target shape 200. In step 52, at least a portion of malleable object 100 and at least a portion of target shape 200 having a predetermined shape aligned with each other to set a first axis of rotation AA. In the embodiment shown in FIG. 2, first axis of rotation AA is set at a point of intersection of first feature 101 of the malleable object 100 and the first feature 201 of the target shape 200. First axis of rotation AA is perpendicular to the plane of malleable object 100 and target shape 200 (e.g. extends out of the page of FIG. 2).

Once the first axis of rotation AA is set, at step 54, the target shape 200 is rotated about the axis of rotation AA until a second feature 202 of the target shape 200 is aligned with a second feature 102 of the malleable object 100, where second feature 202 is spaced apart from first feature 201 on target shape 200 and second feature 102 and first feature 101 are spaced apart along the malleable object 100. FIG. 4 shows a schematic representation step 54 where second feature 202 of the target shape 200 is aligned with second feature 102 of the malleable object 100.

Once second feature 102 of the malleable object 100 is aligned with the second feature 202 of the target shape 200, at step 56, the computing device 10 computes a first error between a third feature 203 of the target shape 200 and the third feature 103 of the malleable object 100, where the third feature 203 of the target shape 200 is spaced apart from the second feature 202 of the target shape 200 and the second feature 202 of the target shape 200 lies between the first feature 201 and the third feature 203, and the third feature 103 of the malleable object 100 is spaced apart from the first feature 102 of the malleable object 100 and the second feature 102 of the malleable object 100 lies between the first feature 101 and the third feature 103.

The first error may include a first length error based on a length measurement relating to the third feature 203 of the target shape 200 and the third feature 103 of the malleable object 100 and/or a first angle error based on an angle measurement relating to the third feature 203 of the target shape 200 and the third feature 103 of the malleable object 100. In some embodiments, the length measurement can be determined as a difference between a length of a segment from feature 102 to feature 103 and a length of a segment from feature 202 to feature 203. A segment length error between two bends may be corrected by modifying the position of one of the bends (e.g. opening an existing bend and re-bending the malleable object at another location). However, a segment length error between two features may not be correctable. For example, if two features such as two notches or two nicks are present in a metal die, a segment length error between the two notches or two nicks cannot be corrected because there is a finite amount of material in the segment between the features.

In FIG. 5, dotted lines extended from points 202, 203, 204, 205 and 206 may help visualizing the bend angle in those points. Those dotted lines may also help in visualizing the error in the bend angle as see in FIG. 6 once a point is aligned after rotation.

Figure 6:
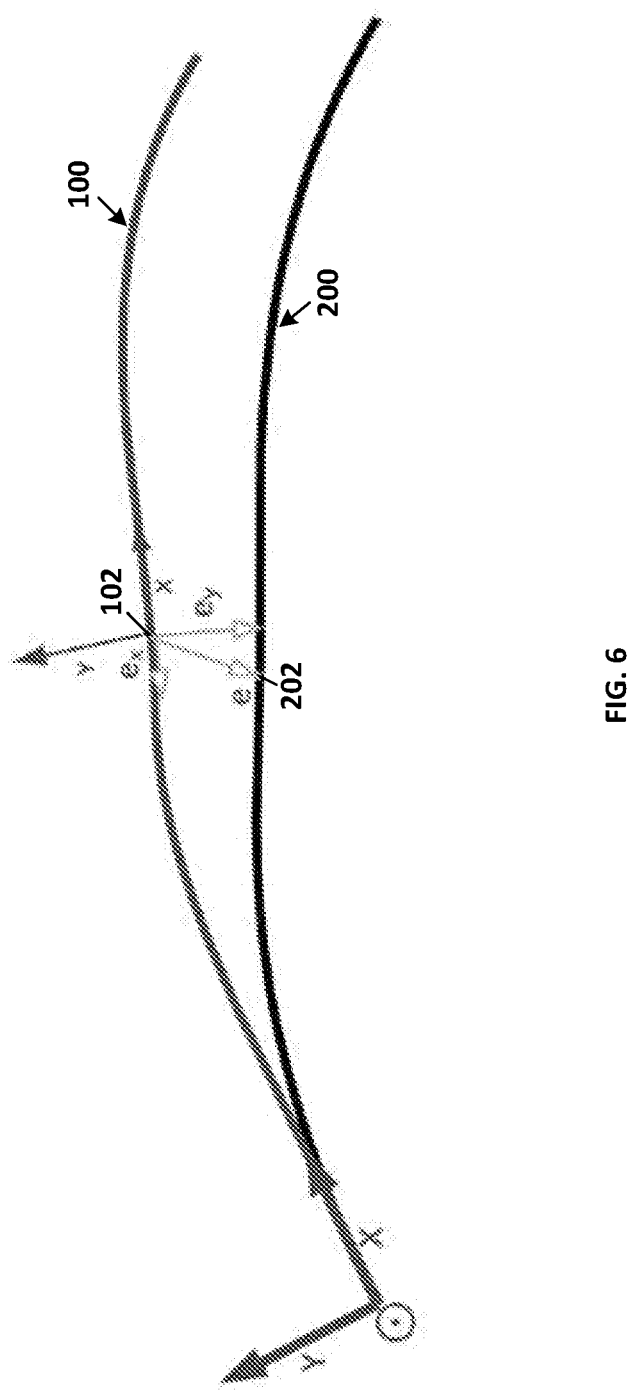
FIG. 6 is a schematic diagram showing a portion of a malleable object having a feature and a portion of a predetermined polygon having a corresponding feature, according to at least one embodiment.

FIG. 6 shows another type of error, specifically a positional error of an anchor point. Anchor points are notches and significant bends. Used as references as they are immovable, and must align to a higher tolerance than the typical, for example, 0.5 mm tolerance.

Figure 7:
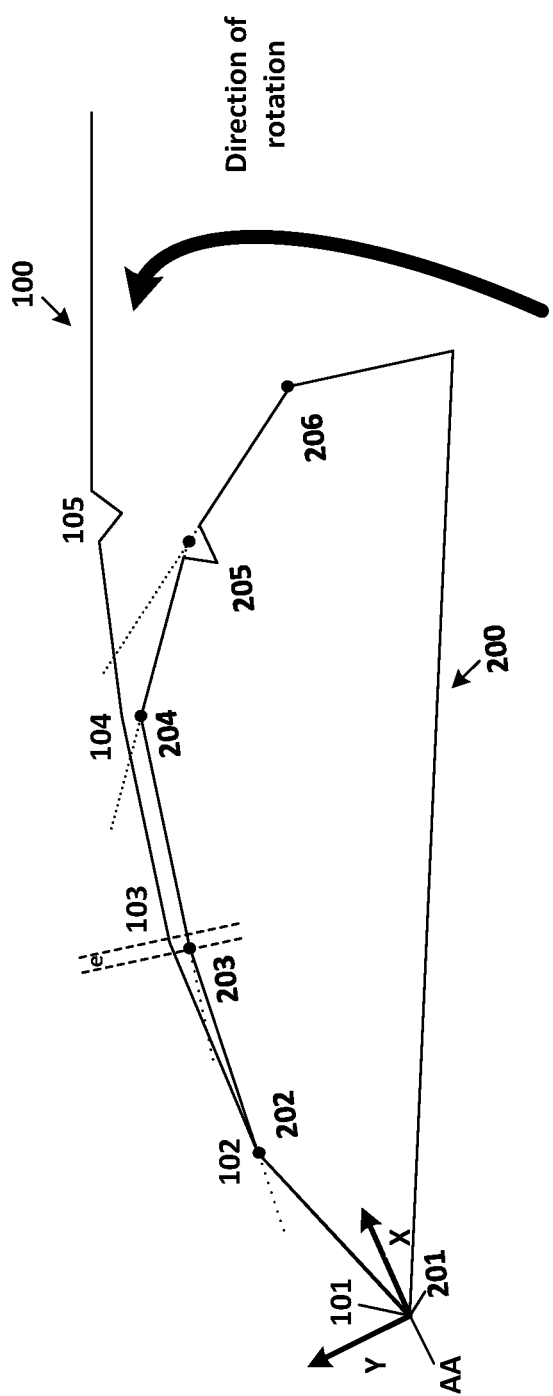
FIG. 7 is a schematic view of a second step of the method of manipulating a malleable object having features to form a predetermined polygon shape based on the position of the features, according to at least one embodiment.

In some embodiments, the error can be an angle. Referring now to FIG. 7, an angle error between the lines around points 203 and 103 is shown therein. Specifically, an angle error around a first line being a line from point 202 to point 203 and a second line being the dotted line from 203 towards 102 extending the segment connecting point 204 to point 203.

In the example shown in FIG. 7, both the resultant length and the angle are erroneous. The first error including the first length error and the first angle error can be stored in a data structure of the computing device 10.

Once the first error has been determined, at step 58, a second axis of rotation BB is set. As in set 52, at step 56 at least a portion of malleable object 100 and at least a portion of target shape 200 are aligned with each other to set a second axis of rotation BB. For instance, as shown in FIG. 7, second axis of rotation BB may be set at a point of intersection of second feature 102 of the malleable object 100 and the second feature 202 of the target shape 200. Second axis of rotation BB is perpendicular to the plane of malleable object 100 and target shape 200 (e.g. extends through the page of FIGS. 5-10).

After the second axis of rotation BB is set at step 60, target shape 200 is rotated about the second axis of rotation BB until third feature 203 of the target shape 200 is aligned with third feature 103 of the malleable object 100.

Once third feature 103 of the malleable object 100 is aligned with third feature 203 of the target shape 200, at step 62, the system 100 computes a second error between a fourth feature 204 of the target shape 200 and the fourth feature 104 of the malleable object 100. Fourth feature 204 of the target shape 200 is spaced apart from the second feature 202 and the third feature 203 of the target shape 200 such that the second feature 202 of the target shape 200 lies between the first feature 201 and the third feature 203 and the third feature 203 of the target shape 200 lies between the second feature 202 and the fourth feature 204. Similarly, fourth feature 104 of the malleable object 100 is spaced apart from the second feature 102 and the third feature 103 of the malleable object 100 such that the second feature 102 of the malleable object 100 lies between the first feature 101 and the third feature 103 and the third feature 103 of the malleable object 100 lies between the second feature 102 and the fourth feature 104.

The second error may include a second length error based on a different between a length measurement relating to the fourth feature 204 of the target shape 200 and the fourth feature 104 of the malleable object 100 and/or a first angle error based on an angle measurement relating to the third feature 203 of the target shape 200 and the third feature 103 of the malleable object 100. In some embodiments, the length error can be determined as a difference between a length of a segment from feature 103 to feature 104 and a length of a segment from feature 203 to feature 204.

Figure 8:
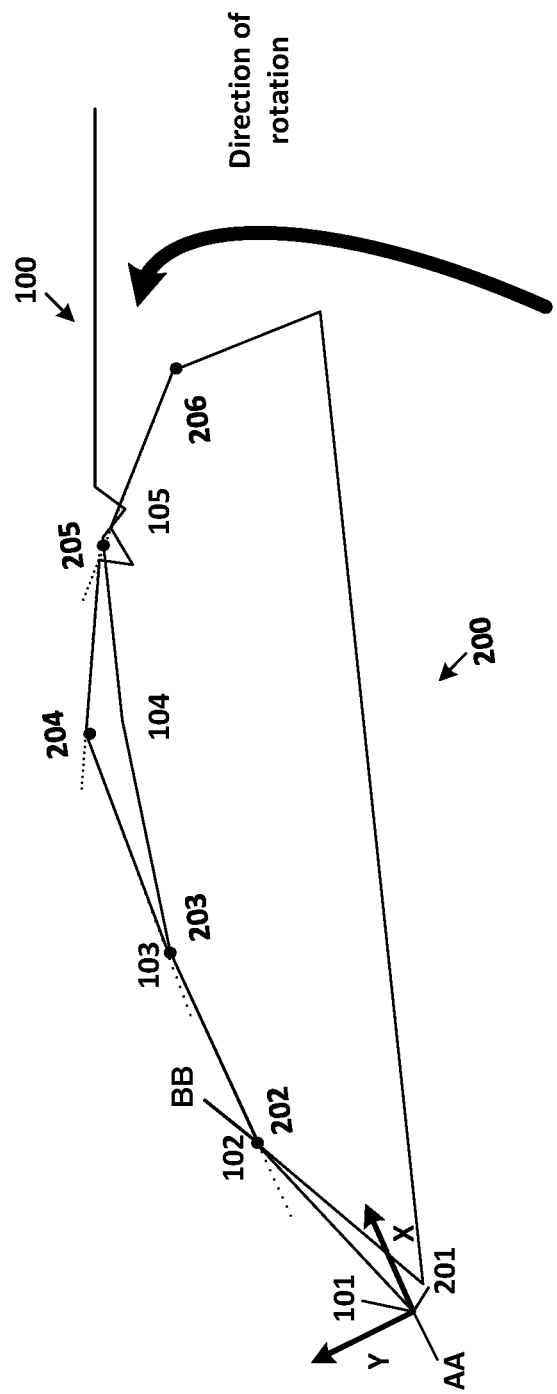
FIG. 8 is a schematic view of a third step of the method of manipulating a malleable object having features to form a predetermined polygon shape based on the position of the features, according to at least one embodiment.
Figure 9:
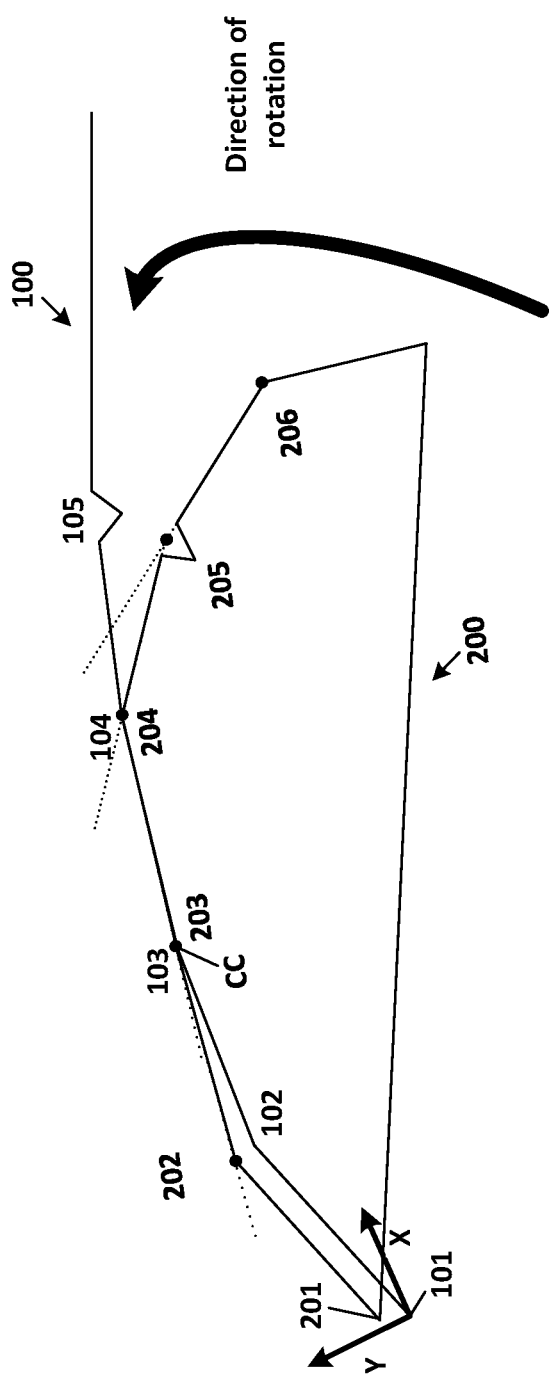
FIG. 9 is a schematic view of a fourth step of the method of manipulating a malleable object having features to form a predetermined polygon shape based on the position of the features, according to at least one embodiment.

It should be noted that the schematic shown in FIG. 8 shows that the malleable object 100 is overbent at feature 103 as the malleable object 100 passes through the target shape 200 after third feature 103. Specifically, point 104 (i.e. actual point on the malleable object 100) is not aligned with point 204 (i.e. of the target object 200) and point 104 is within the target shape 200 of the target shape. Third feature (e.g. a bend) 103 should be corrected.

The scope of that correction strategy is derived from the recipe generator module 1010 (see FIG. 2) based on the various error representations provided by the error quantification module 1014. For clarity, the error quantification module 1014 creates different error representations and the recipe generator module 1010 maps required actions to correct various types and sizes of errors.

When the malleable object 100 is overbent, prior to subsequent rotation of the target shape 200, malleable object 100 should be translated to align third feature 103 to second feature 203. Once third feature 103 is aligned with third feature 203, target shape 200 can be rotated about a third axis of rotation CC corresponding to a point where third feature 103 is aligned with third feature 203 (see FIG. 9). Rotation of target shape 200 continues until fourth feature 204 is aligned with further feature 104.

In some embodiments, once fourth feature 104 of the malleable object 100 is aligned with fourth feature 204 of the target shape 200, the method 50 includes computing a third error between a fifth feature 205 of the target shape 200 and a fifth feature 105 of the malleable object 100. Fifth feature 205 of the target shape 200 is spaced apart from the second feature 202 and the third feature 203 of the target shape 200 such that the second feature 202 of the target shape 200 lies between the first feature 201 and the third feature 203 and the third feature 203 of the target shape 200 lies between the second feature 202 and the fourth feature 204. Similarly, fourth feature 104 of the malleable object 100 is spaced apart from the second feature 102 and the third feature 103 of the malleable object 100 such that the second feature 102 of the malleable object 100 lies between the first feature 101 and the third feature 103 and the third feature 103 of the malleable object 100 lies between the second feature 102 and the fourth feature 104.

The third error may include a third length error based on a different between a length measurement relating to the fifth feature 205 of the target shape 200 and the fifth feature 105 of the malleable object 100 and/or a first angle error based on an angle measurement relating to the fourth feature 204 of the target shape 200 and the fourth feature 104 of the malleable object 100. In some embodiments, the length measurement can be determined as a difference between a length of a segment from fourth feature 204 to fifth feature 205 and a length of a segment from fourth feature 104 to fifth feature 105.

Figure 10:
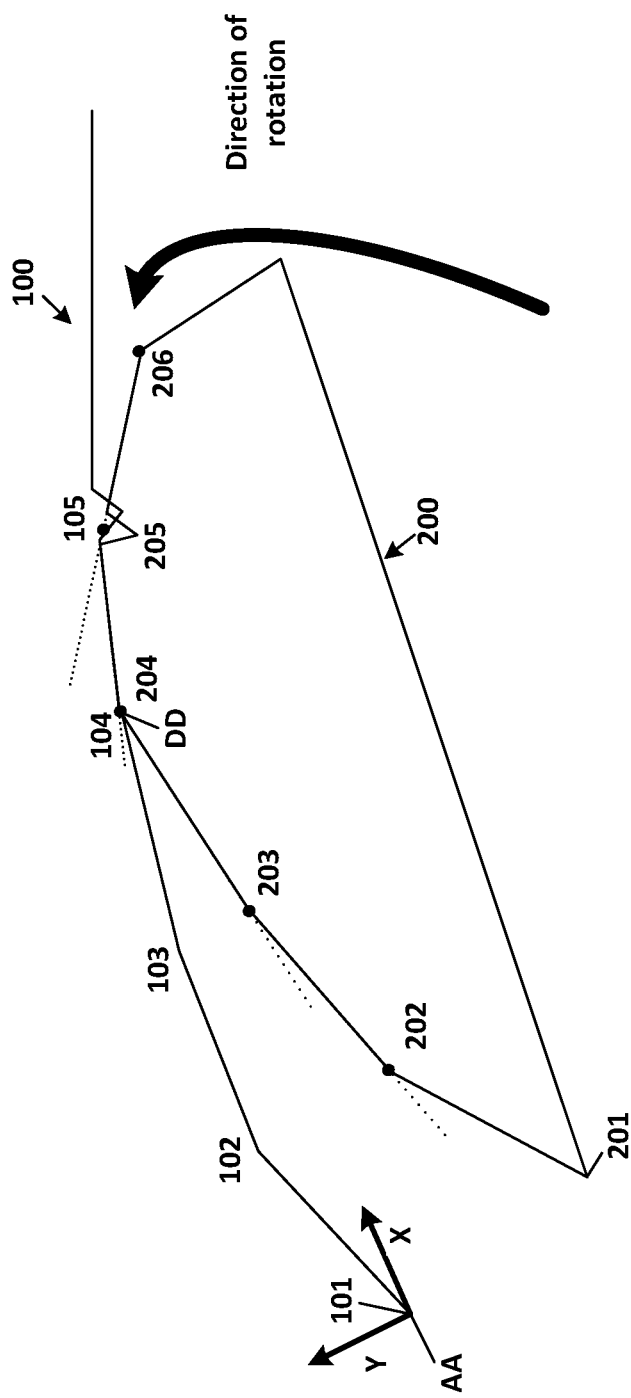
FIG. 10 is a schematic view of a fifth step of the method of manipulating a malleable object having features to form a predetermined polygon shape based on the position of the features, according to at least one embodiment.

Optionally, FIG. 10 shows another iteration in the method 50 of determining a difference of position between malleable object 100 and a target shape 200 where rotation of target shape 200 continues about a fourth axis of rotation DD until fifth feature 205 of the target shape 200 is aligned with fifth feature 105 of the malleable object.

Additional Error Types

Figure 11:
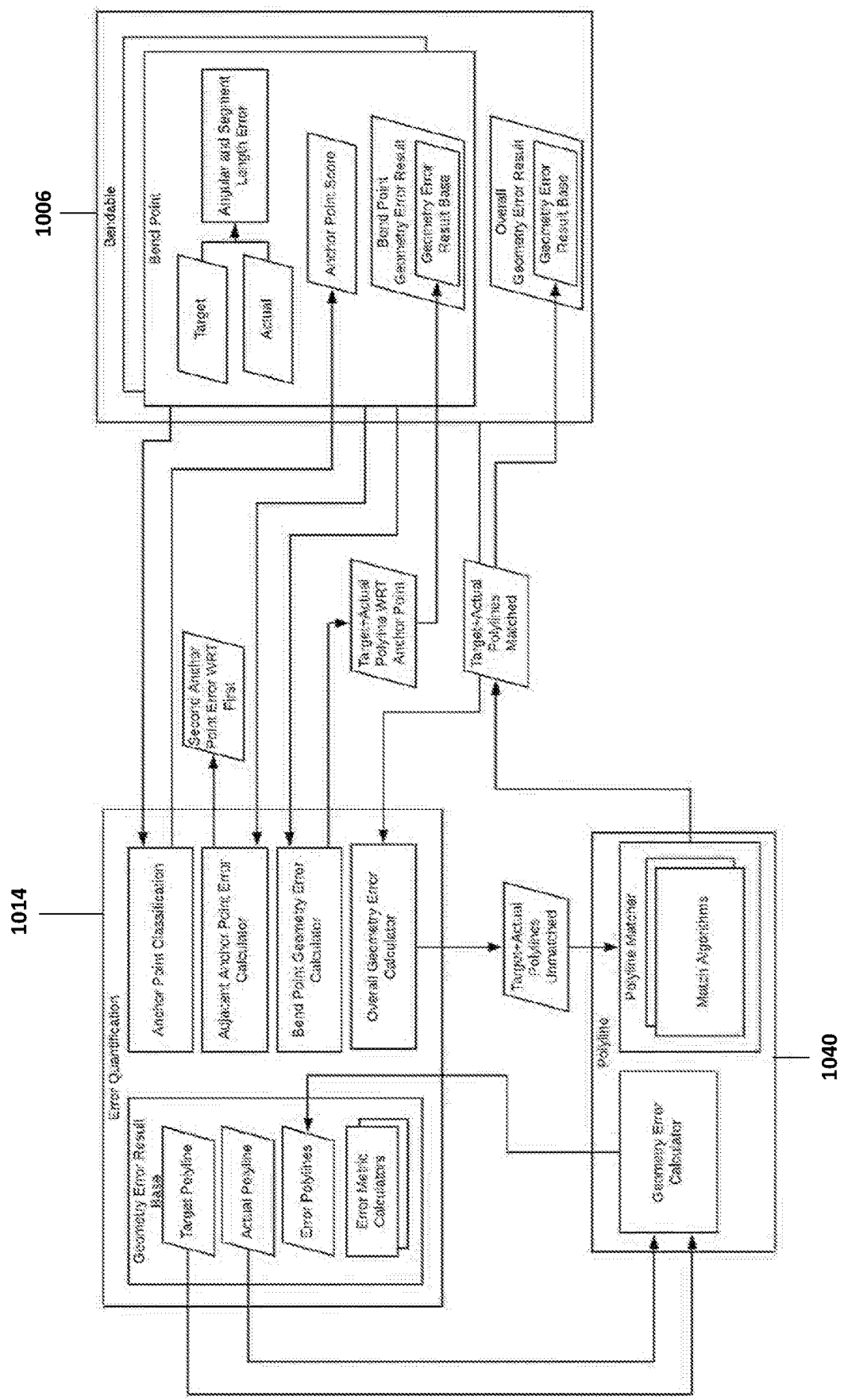
FIG. 11 is a workflow diagram showing a modular software architecture of the error quantification module of FIG. 2.

Referring now to FIG. 11, illustrated therein is a detailed portion of the architecture shown in FIG. 2 including the error quantification module 1014. Error quantification module 1014 creates different error representations such as those described below.

Figure 12B:
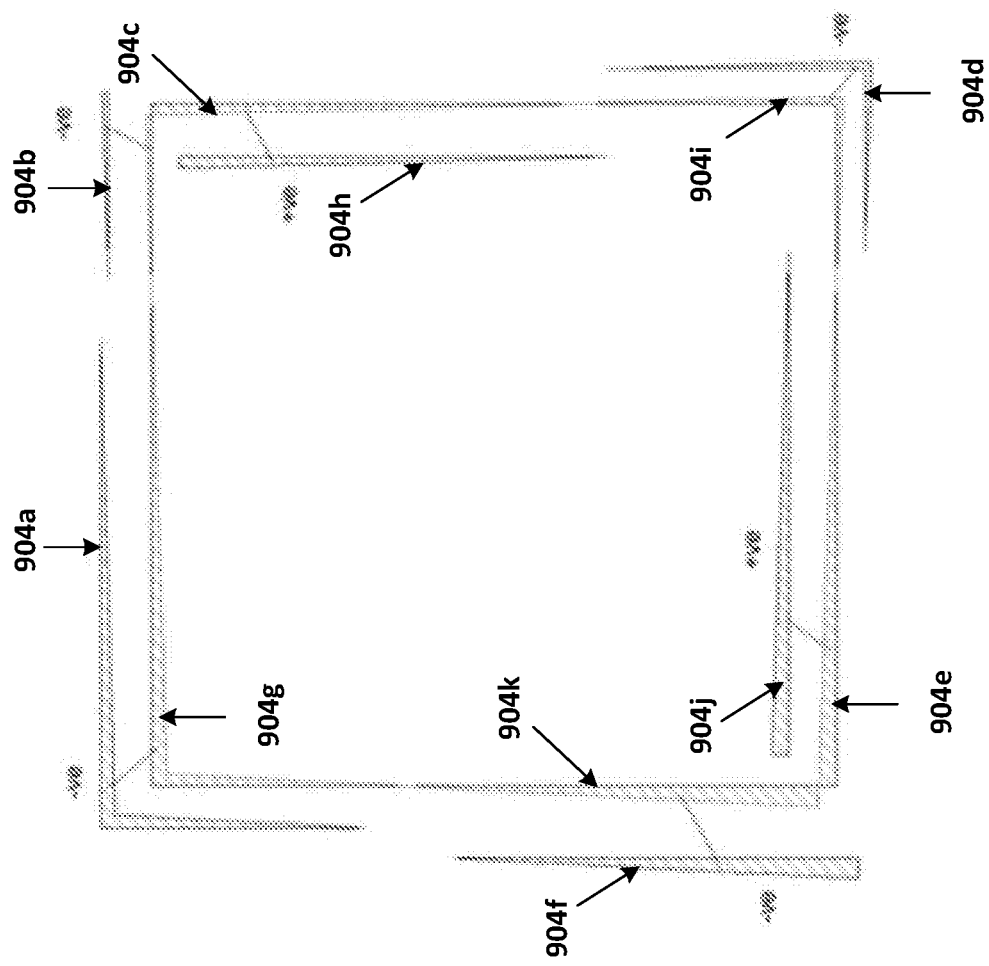
FIGS. 12A and 12B are plan views illustrating geometry error types, according to one embodiment.
Figure 12A:
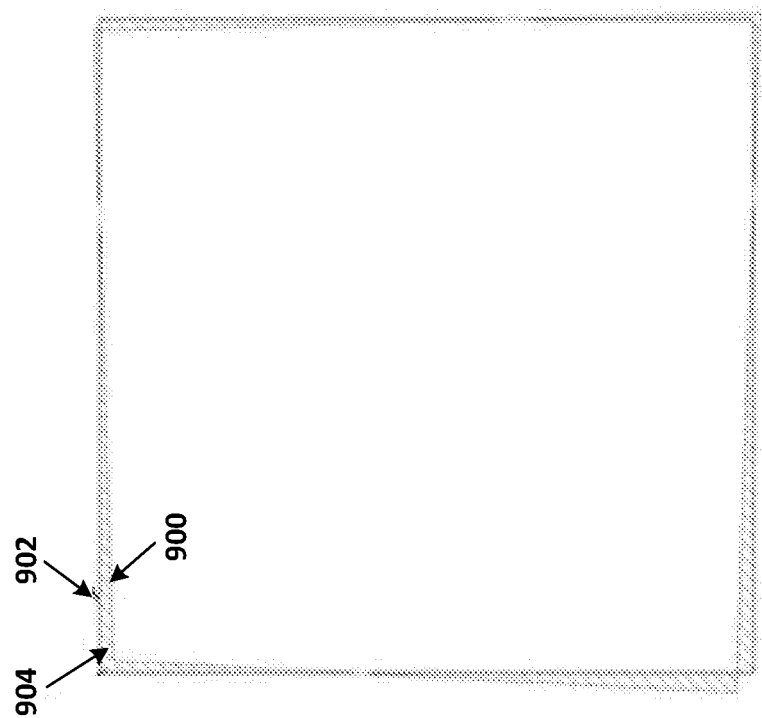

Referring now to FIG. 12A, illustrated therein is an example of a geometry error. Given two polylines 900 and 902, an error can be reported in the form of an area calculated as a cumulative area of shapes present between adjacent line segments of the polylines 900, 902. For instance, area 904 shown on FIG. 11A is one example of one area between adjacent line segments of polylines 900 and 902.

FIG. 12B shows a plurality of areas 904a-k represented as enclosed within bounding polylines. In this example, each of areas 904a-k have triangular or quadrilateral shapes. More complex polylines 900, 902 may yield more complex areas 904. The co-ordinates of areas 904 are useful and actionable for the recipe generator.

In addition to the polylines' coordinates, another piece of useful information is a position of an area 904 relative to the target shape (e.g. polyline 902). If the area 904 is inside polyline 902, area 904 is a positive error and requires a negative angle bend for correction. If the area 904 is outside polyline 902, area 904 is a negative error and requires a positive angle bend for correction.

These two properties of the enclosed shapes (area 904 co-ordinates relative to polyline 902 and whether or not the area 904 is a positive error negative error) can be passed to the CAD matcher and recipe generator. A user should be able to specify which reference frame they want the co-ordinates of the polyline to be in. For example, the user might want the polylines to be expressed with respect to polyline 900 (see FIG. 12A) or an anchor point (see FIG. 12B)

Figure 13A:
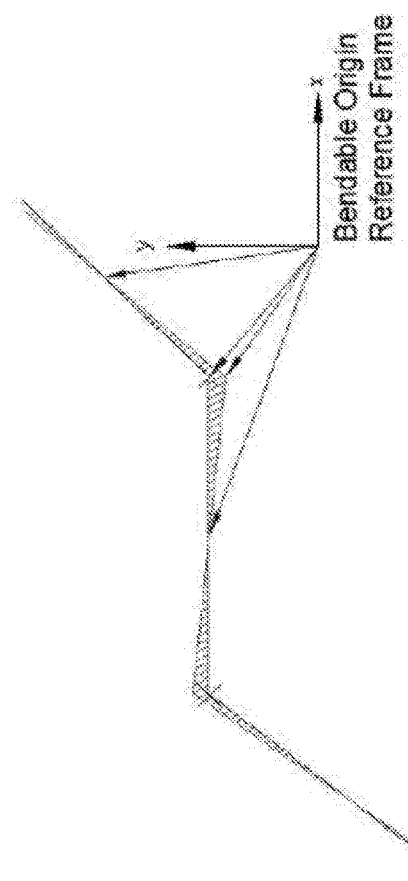
FIGS. 13A and 13B are plan views illustrating bend point geometry errors, according to one embodiment.
Figure 13B:
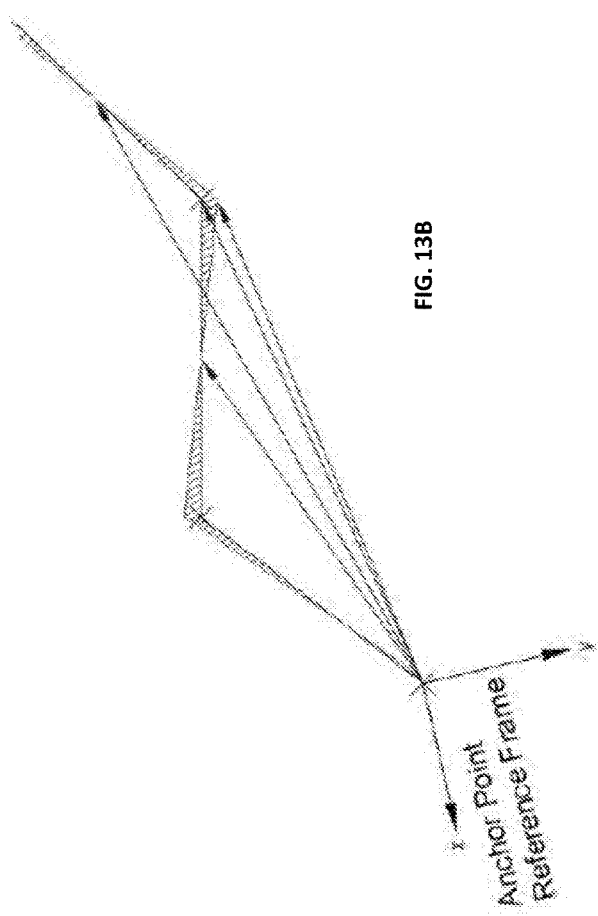

For instance, with reference to FIG. 13A, a bend point can be aligned in order to show geometry error with the bend point as a reference. FIG. 13A shows an example where a bendable origin bend point as a reference and FIG. 13B shows an example with an anchor point as a reference.

Figure 14:
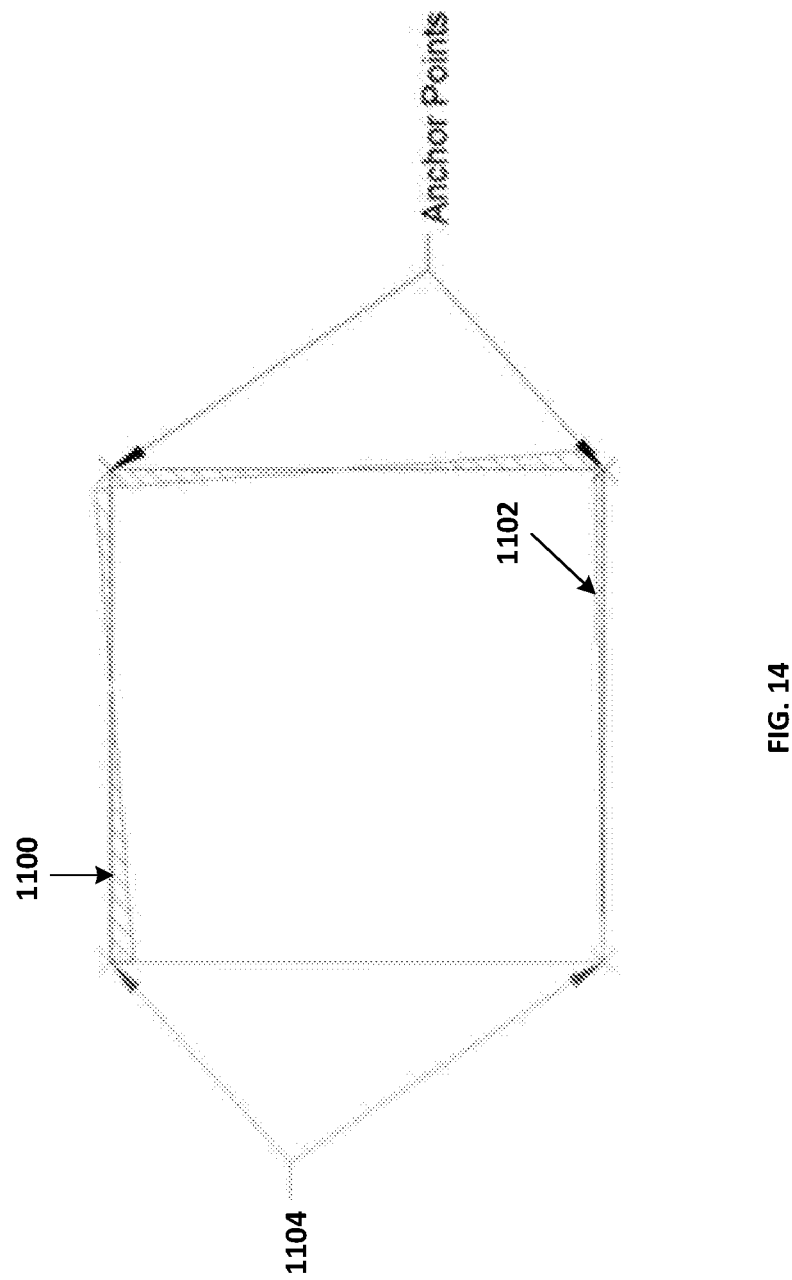
FIG. 14 is a plan view of illustrating a overall geometry error, according to one embodiment.

Referring now to FIG. 14, for two polylines 1100 and 1102 (e.g. actual shape and target shape, respectively), there exists a transformation (translation and rotation) that minimizes the total geometry error. To determine the transformation, two processes may be possible. First, in examples where the polylines 1100 and 1102 were originally aligned to minimize a total geometry error, the polylines 1100 and 1102 may be aligned based on a set of selected anchor points 1104. A new geometry error may be calculated after the shapes have been aligned based on the set selected anchor points 1104.

Figure 15:
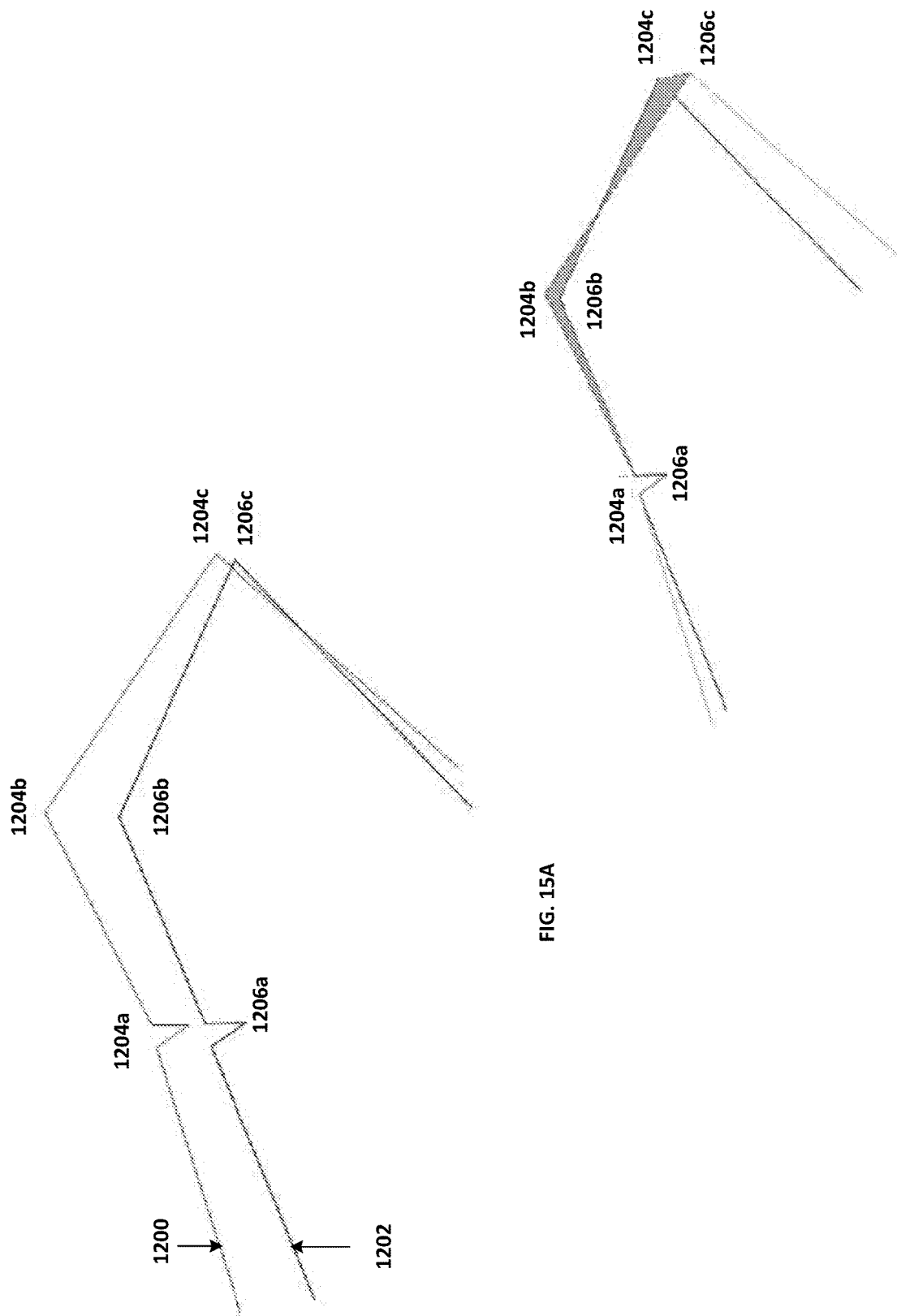
FIGS. 15A and 15B are plan views illustrating adjacent anchor point errors, according to one embodiment.

Referring now to FIGS. 15A and 15B, illustrated therein is an example of an adjacent anchor point error. An adjacent anchor point error is an error of a second adjacent anchor point with respect to a first adjacent error point. The Adjacent Anchor Point Error Calculator of error quantification module 1014 takes two adjacent anchor points, and returns the error of the second anchor point with respect to the first anchor point. In the example shown in FIGS. 15A and 15B, given polyline (e.g. actual malleable object geometry) 1200 and a polyline (e.g. target shape geometry) 1202, when features 1204a and 1206a of the polyline 1200 and the polyline 1202, respectively, are aligned, the adjacent anchor point error is calculated between the features 1204c and 1206c.

Figure 16:
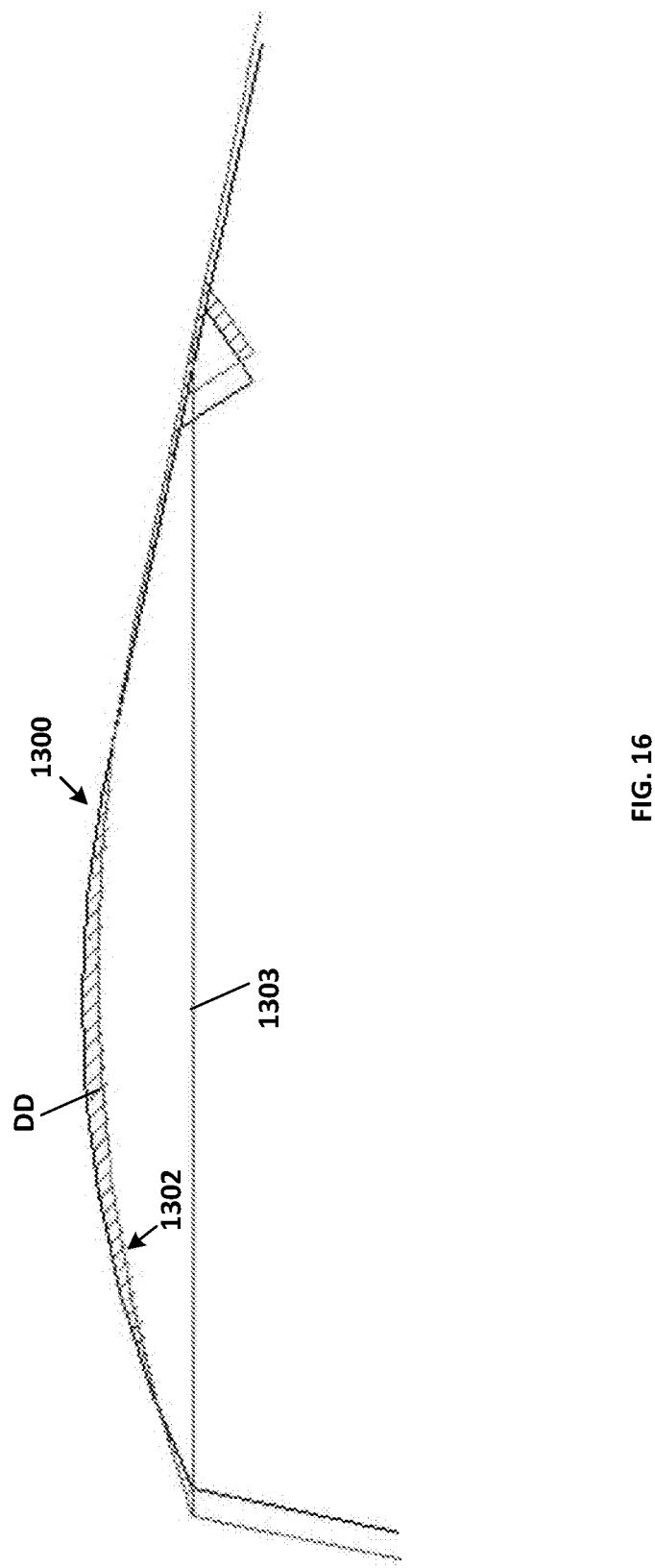
FIG. 16 is a plan view illustrating an accordion anchor point errors, according to one embodiment; and The skilled person in the art will understand that the drawings, further described below, are for illustration purposes only. The drawings are not intended to limit the scope of the applicant's teachings in any way. Also, it will be appreciated that for simplicity and clarity of illustration, elements shown in the figures have not necessarily been drawn to scale. For example, the dimensions of some of the elements may be exaggerated relative to other elements for clarity. Further aspects and features of the example embodiments described herein will appear from the following description taken together with the accompanying drawings.

Referring now to FIG. 16, illustrated therein is an example of an accordion anchor point error. In this example, an accordion anchor point error is a geometry error between two adjacent bend points. As shown in FIG. 16, malleable object (i.e. actual) 1300 is shown against target shape 1302. Malleable object 1300 is misaligned with target shape 1302 by the mid-point of a straight line 1303 from one anchor point to the adjacent.

The errors described thus far can generally be described as planar errors. Herein, the term "planar errors" generally refers to a misalignment of features within a plane that is common to the target shape and the malleable object.

With regards to non-planar error types, twist errors and bow errors are two examples of non-planar errors that may occur in the object when trying match the object to the polygon shape.

Returning to FIG. 2, CAD matcher 1004 includes an edge polyline module 1040, a twist and bow profile module 1042, and a feature finder module 1044.

Twist and bow profile module 1042 identifies twist and bow errors. A twist error refers to an amount of out-of-plane deformation (e.g. with respect to the local x-z plane of the frame of reference depicted in FIG. 5). One example of a twist error is the pitch of a propeller blade. A bow errors refer to a non-planarity of an edge of the malleable object (e.g. the cutting edge when the malleable object is a die) in the x-y plane.

Feature finder module 1044 includes a segment fitting module 1046, a notch finder module 1047 and a notch sizer module 1048.

In the segment fitting module 1046, a model is created (e.g. a line in 2D) with an initial estimate of its parameters. A set of adjacent points from the ordered point cloud is taken and the fit error is quantified. The model error is computed and thus the line model (parameters) adjusted. The subset is enlarged and fitted again with the new model. The processes converges once every new point added increase the validation error beyond a target threshold value.

Notch finder 1047 provides for identifying notches of the malleable object 100. A notch in two-dimensions can be represented as any parametric function of varying complexity (i.e. a parametric cubic spline or a Bezier curve). Moreover, notch finder 1047 can assign a geometrical size (e.g. classify and categorize) a specific geometry to is (i.e a v-notch 4 mm deep 5 mm wide or a round notch of radius 3 mm)

Notches are an instance of anchor points (e.g. also referred to as point types and error types, above) due to their unique geometrical shape and the fact they can't be moved once formed. As such, CAD matching can take advantage of those points' location and size with respect to target shape. In doing so, alignment of actual shape with target and quantify the varying types of errors is more efficient.

Notches are three-dimensional features formed into the malleable object (e.g. steel die) but those can be projected to 2D and may be represented by a variety of parametric models such as, but not limited to, splines, bezier curves, parametric polynomials, a combination of parameterize radial basis functions, etc.

The input to the notch finder 1047 (and sizer 1048, implicit in the model) is a point cloud and a target geometry shape representing the die to form. Along the virtual representation of the malleable object 100 (e.g. virtual die/bendable target values), there are features of known location and shape. For each feature type, a generalized parametric model, of the aforementioned categories, is used to locate and fit the model onto the point cloud.

Specifically, the process used is random sample consensus (RANSAC) by selecting a sub-set of points from the point cloud, training the model to minimize the fit error onto the sub-set. With the model in hand, the fit error to the rest of the set (the complement) is evaluated, called validation error. The process continues until the validation error is within acceptable threshold with the implicit sufficient fit of the model onto the subset representing the notch.

Returning to FIG. 2, the bendable module 1006 is a virtual depiction of a die (i.e. malleable object 100). It is a concatenation of features (i.e. line segments, notches, bends), each holding information on the current state of the object. Each bend point holds target formation values, estimated and actual (scanned). The bendable has several methods that allow manipulation of the information with actions such as bending (modification of a bend point data), new bend (insertion of a bend point) and forming (insertion of a form point such as a notch).

Production 1008 is an action execution. The action (or list of actions) is the output of the recipe generator 1010, based upon the error quantification module 1014 output.

For example, if the error quantification module 1014 may show there is a bend angle error at a point, the recipe generator 1010 may advise the system 1 to bend the malleable object 100 to a target angle at the point. This bending of the malleable object is an action that would be executed during the production step 1008.

An estimated error value (based on a predictive forming model) can be updated into the bendable module 1006 and, once a scan and a new CAD matching run is conducted, the actual value may be updated.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

What is claimed is:

1. A method of determining a difference of position between a malleable object and a target shape, the difference of position including a plurality of errors between features of the malleable object and corresponding features of the target shape, the method comprising;

setting a first axis of rotation of the target shape at a point where a first feature of the malleable object is aligned with a corresponding first feature of the target shape;

rotating the target shape about the first axis of rotation until a second feature of the target shape is aligned with a corresponding second feature of the malleable object;

when the second feature of the target shape is aligned with the second feature of the malleable object, calculating a first error between a third feature of the target shape and a third feature of the malleable object, the third feature of the target shape being positioned a greater distance away from the first feature of the target shape than the second feature of the target shape, and the third feature of the malleable object being positioned a greater distance away from the first feature of the malleable object than the second feature of the malleable object;

rotating the target shape about a second axis of rotation until the third feature of the malleable object is aligned with the third feature of the target shape, the second axis of rotation being at a point where the second feature of the malleable object is aligned with the corresponding second feature of the target shape; and when the third feature of the target shape is aligned with the third feature of the malleable object, calculating a second error between a fourth feature of the target shape and a fourth feature of the malleable object, the fourth feature of the target shape being positioned a greater distance away from the first feature of the target shape than the second feature of the target shape and the third feature of the target shape, and the fourth feature of the malleable object being positioned a greater distance away from the first feature of the malleable object than the second feature of the malleable object and the third feature of the malleable object;

wherein the first error and the second error define the difference of position between the malleable object and the target shape.

2. The method of claim 1, wherein the first error includes a first length error, the first length error being a difference of:
   a length of a line segment between the second feature of the target shape and the third feature of the target shape; and
   a length of a line segment between the second feature of the malleable object and the third feature of the malleable object.

3. The method of claim 1, wherein the first error includes a first angle error, the first angle error being a difference of:
   a first target shape bend angle between a segment connecting the second feature of the target shape and the third feature of the target shape, and a horizontal line passing through the third feature of the target shape, and
   a first malleable object bend angle between a segment connecting the second feature of the malleable object and the third feature of the malleable object, and a horizontal line passing through the third feature of the malleable object.

4. The method of claim 1, wherein the second error includes a second length error, the second length error being a difference of:
   a length of a line segment between the third feature of the target shape and the fourth feature of the target shape; and
   a length of a line segment between the third feature of the malleable object and the fourth feature of the malleable object.

5. The method of claim 1, wherein the second error includes a second angle error, the second angle error being a difference of:
   a second target shape bend angle between a segment connecting the third feature of the target shape and the fourth feature of the target shape, and a horizontal line passing through the fourth feature of the target shape, and
   a second malleable object bend angle between a segment connecting the third feature of the malleable object and the fourth feature of the malleable object, and a horizontal line passing through the fourth feature of the malleable object.

6. The method of claim 1, further comprising
   rotating the target shape about a third axis of rotation until the fourth feature of the malleable object is aligned with the fourth feature of the target shape, the third axis of rotation being at a point where the third feature of the malleable object is aligned with the corresponding third feature of the target shape; and
   when the fourth feature of the target shape is aligned with the fourth feature of the malleable object, calculating a third error between a fifth feature of the target shape and a fifth feature of the malleable object, the fifth feature of the target shape being positioned a greater distance away from the first feature of the target shape than the second feature of the target shape, the third feature of the target shape and the fourth feature of the target shape, and the fifth feature of the malleable object being positioned a greater distance away from the first feature of the malleable object than the second feature of the malleable object, the third feature of the malleable object and the fourth feature of the malleable object;

wherein the first error, the second error and the third error define the difference of position between the malleable object and the target shape.

7. The method of claim 6, wherein the third error includes a third length error, the third length error being a difference between:
   a length of a line segment between the fourth feature of the target shape and the fifth feature of the target shape; and
   a length of a line segment between the fourth feature of the malleable object and the fifth feature of the malleable object.

8. The method of claim 6, wherein the third error includes a third angle error, the third angle error being a difference of:
   a third target shape bend angle between a segment connecting the fourth feature of the target shape and the fifth feature of the target shape, and a horizontal line passing through the fifth feature of the target shape, and
   a third malleable object bend angle between a segment connecting the fourth feature of the malleable object and the fifth feature of the malleable object, and a horizontal line passing through the fifth feature of the malleable object.

9. The method of claim 1, wherein the malleable object is a metal strip.

10. The method of claim 9, wherein the target shape is a die formed by bending the metal strip.

11. The method of claim 9, wherein the any one or more of the features is a notch or a nick in the metal strip.

12. A system for determining a difference of position between a malleable object and a target shape, the difference of position including a plurality of errors between features of the malleable object and corresponding features of the target shape, the system comprising:
   a first computing device having a first processor, a first non-transitory processor-readable storage medium communicatively coupled to the first processor, and a first communication interface communicatively coupled to the first processor; the processor configured to execute a method, the method comprising:
      setting a first axis of rotation of the target shape at a point where a first feature of the malleable object is aligned with a corresponding first feature of the target shape;
      rotating the target shape about the first axis of rotation until a second feature of the target shape is aligned with a corresponding second feature of the malleable object;
      when the second feature of the target shape is aligned with the second feature of the malleable object, calculating a first error between a third feature of the target shape and a third feature of the malleable object, the third feature of the target shape being positioned a greater distance away from the first feature of the target shape than the second feature of the target shape, and the third feature of the malleable object being positioned a greater distance away from the first feature of the malleable object than the second feature of the malleable object;
      rotating the target shape about a second axis of rotation until the third feature of the malleable object is aligned with the third feature of the target shape, the second axis of rotation being at a point where the second feature of the malleable object is aligned with the corresponding second feature of the target shape; and when the third feature of the target shape is aligned with the third feature of the malleable object, calculating a second error between a fourth feature of the target shape and a fourth feature of the malleable object, the fourth feature of the target shape being positioned a greater distance away from the first feature of the target shape than the second feature of the target shape and the third feature of the target shape, and the fourth feature of the malleable object being positioned a greater distance away from the first feature of the malleable object than the second feature of the malleable object and the third feature of the malleable object;

wherein the first error and the second error define the difference of position between the malleable object and the target shape.

13. The system of claim 12, wherein the first error includes a first length error, the first length error being a difference of:
a length of a line segment between the second feature of the target shape and the third feature of the target shape; and
a length of a line segment between the second feature of the malleable object and the third feature of the malleable object.

14. The system of claim 12, wherein the first error includes a first angle error, the first angle error being a difference of:
a first target shape bend angle between a segment connecting the second feature of the target shape and the third feature of the target shape, and a horizontal line passing through the third feature of the target shape, and
a first malleable object bend angle between a segment connecting the second feature of the malleable object and the third feature of the malleable object, and a horizontal line passing through the third feature of the malleable object.

15. The system of claim 12, wherein the second error includes a second length error, the second length error being a difference of:
a length of a line segment between the third feature of the target shape and the fourth feature of the target shape; and
a length of a line segment between the third feature of the malleable object and the fourth feature of the malleable object.

16. The system of claim 12, wherein the second error includes a second angle error, the second angle error being a difference of:
a second target shape bend angle between a segment connecting the third feature of the target shape and the fourth feature of the target shape, and a horizontal line passing through the fourth feature of the target shape, and
a second malleable object bend angle between a segment connecting the third feature of the malleable object and the fourth feature of the malleable object, and a horizontal line passing through the fourth feature of the malleable object.

17. The system of claim 12, further comprising
rotating the target shape about a third axis of rotation until the fourth feature of the malleable object is aligned with the fourth feature of the target shape, the third axis of rotation being at a point where the third feature of the malleable object is aligned with the corresponding third feature of the target shape; and when the fourth feature of the target shape is aligned with the fourth feature of the malleable object, calculating a third error between a fifth feature of the target shape and a fifth feature of the malleable object, the fifth feature of the target shape being positioned a greater distance away from the first feature of the target shape than the second feature of the target shape, the third feature of the target shape and the fourth feature of the target shape, and the fifth feature of the malleable object being positioned a greater distance away from the first feature of the malleable object than the second feature of the malleable object, the third feature of the malleable object and the fourth feature of the malleable object;

wherein the first error, the second error and the third error define the difference of position between the malleable object and the target shape.

18. The system claim 17, wherein the third error includes a third length error, the third length error being a difference between:
a length of a line segment between the fourth feature of the target shape and the fifth feature of the target shape; and
a length of a line segment between the fourth feature of the malleable object and the fifth feature of the malleable object.

19. The system of claim 17, wherein the third error includes a third angle error, the third angle error being a difference of:
a third target shape bend angle between a segment connecting the fourth feature of the target shape and the fifth feature of the target shape, and a horizontal line passing through the fifth feature of the target shape, and
a third malleable object bend angle between a segment connecting the fourth feature of the malleable object and the fifth feature of the malleable object, and a horizontal line passing through the fifth feature of the malleable object.

* * * * *